United States Patent [19]
Miyamoto et al.
[11] 3,906,382
[45] Sept. 16, 1975

[54] FREQUENCY DISCRIMINATION CIRCUIT

[75] Inventors: Bunichi Miyamoto, Sagamihara; Yasuo Tanishima; Takafumi Shimizu, both of Kawasaki, all of Japan

[73] Assignee: Fujitsu Ltd., Kawasaki, Japan

[22] Filed: Aug. 6, 1974

[21] Appl. No.: 495,299

[30] Foreign Application Priority Data

Aug. 9, 1973 Japan .............................. 48-89432

[52] U.S. Cl. .............................. 328/134
[51] Int. Cl.² .............................. H03B 3/04
[58] Field of Search .............................. 328/133, 134; 307/233

[56] References Cited

UNITED STATES PATENTS

| | | | |
|---|---|---|---|
| 3,501,701 | 3/1970 | Reid | 328/134 |
| 3,588,710 | 6/1971 | Masters | 328/133 |
| 3,714,463 | 1/1973 | Laune | 328/134 X |

*Primary Examiner*—John S. Heyman
*Attorney, Agent, or Firm*—Staas & Halsey

[57] ABSTRACT

A signal to be discriminated of frequency $f_1$ and a reference signal of frequency $f_2$ are applied to a mixer which outputs two quadrature phase related, reversible beat frequency signals $\dot{e}_a$ and $\dot{e}_b$, in accordance with the frequency conditions of $f_1 < f_2$ or $f_1 > f_2$. The signals $\dot{e}_a$ and $\dot{e}_b$ are coded into two level signals as to their respective levels. A phase discrimination circuit receives the signals $\dot{e}_a$ and $\dot{e}_b$ and outputs an AC signal at the beat frequency, selectively at one or the other of its two output terminals in accordance with a leading or lagging (delayed) phase relation of one beat frequency signal relative to the other, the phase of which is taken as a reference. The phase discrimination circuit includes a memory circuit which stores the condition of the levels of the level coded signals $\dot{e}_a$ and $\dot{e}_b$ occurring during a predetermined one-fourth period of a cycle and produces a corresponding output. Means then respond to the memory output and at least one of the beat frequency signals to produce an output indicative of the leading or lagging phase relation of one beat frequency signal relative to the other.

16 Claims, 12 Drawing Figures

FREQUENCY DISCRIMINATION CIRCUIT

BACKGROUND OF THE INVENTION

1. Field of the Invention

The present invention relates to a frequency discrimination circuit, and more particularly, to a frequency discrimination circuit for automatic frequency control systems (hereinafter referred to as AFC) which can operate over a wide frequency range from a low frequency to an ultra-high frequency.

2. Description of the Prior Art

Up to now, various kinds of frequency discrimination circuits have been developed for AFC systems, for instance, to stabilize the frequency of self-excitation oscillators; an early well-known method (Method I) utilizes the resonant characteristic obtained from the combination of a coil and capacitor. Thereafter, a second method (Method II) was devised and put into practical use, where the frequency difference between a reference frequency signal and a signal to be discriminated is detected; the signals are fed alternately to a frequency discrimination circuit, which need not have a high precision, by a switching circuit operated by an appropriate square wave signal. No output appears when the reference frequency is the same as the signal to be discriminated, while a square-wave output signal appears in case some frequency differences are detected. Moreover, the frequency discrimination output can be obtained by performing synchronous detection with the said square-wave signal by utilizing a fact that the phase of the square-wave output is reversed according to the results of comparison (lower or higher) of the signal to be discriminated with the reference frequency signal.

Recently, on the other hand, a third method (Method III, hereinafter referred to as Beat Polarity Discrimination Type Frequency Discrimination Circuit) has been made public for the purpose of obtaining a frequency discrimination output from communication equipment, wherein a known reference frequency signal (frequency: $f_2$) and a signal to be discriminated (frequency: $f_1$) are applied to a circuit consisting of two units comprising a modulator and a 90° phase shifter; two beat frequency signals, the phase relation of which varies according to the frequency relation between $f_1$ and $f_2$ are extracted as the output signals of the circuit, and a pulse signal having a constant pulse width is formed by detecting the variations of the amplitude of one of the beat frequency signals; then, this pulse signal and the other beat frequency signal are fed to a pair of gate circuits, which provide the frequency discrimination output by identifying whether the beat frequency signal results from the $f_1 - f_2$ or from $f_2 - f_1$.

In the case of the Method I mentioned above, it is very difficult to obtain highly accurate signal output due to the thermal variations of the LC constant and aging characteristics; in the case of Method II, there are several disadvantages, in that since a switching circuit is required, the discriminated signal tends to receive the influences of the switching noise since a square-wave signal is used for the switching circuit and error is likely to occur in the discriminated signal due to the waveform distortion of the square-wave signal. Therefore, it can be said that the method II is very difficult to be put into practical use, even though it is excellent in its principle.

In method III, it is necessary to widen the pulse width for raising the sensitivity of frequency discrimination, since the DC output is extracted according to the density of pulses discriminated and on the other hand, it has the disadvantage that it is quite difficult to obtain high sensitivity and wide frequency range unless it is by far improved, since the frequency bandwidth of the discriminated frequency is in reverse proportion to the pulse width.

SUMMARY OF THE INVENTION

One of the objects of the present invention is to provide a frequency discrimination circuit which avoids such disadvantages of existing methods mentioned above and particularly to provide an improvement in the frequency discrimination circuit of the third type (Method III). A further object of the invention is to offer a highly sensitive and wide-range frequency discrimination circuit wherein the operating principle of its major sections is quite different from that of existing methods.

Moreover, one embodiment of the frequency discrimination circuits of the present invention provides a mixer to which a signal having the frequency $f_1$ to be discriminated and a reference signal having the frequency $f_2$ are applied, where one of two beat frequency output signals is considered a standard signal, and the phase of the other beat frequency output signal is always in quadrature relation to that of the said standard (reference) signal, and which outputs two beat frequency signals $\dot{e}_a$ and $\dot{e}_b$ according to the frequency conditions of $f_1 < f_2$ or $f_1 > f_2$, respectively. The phase discrimination circuit includes two output terminals, and outputs an AC signal, based on the frequency of the beat frequency signal, to one of the two terminals according to the lead or delay of the phase of the one beat frequency signal relative to that of the other beat frequency signal. The discriminator thus is characterized by the said two beat frequency signals $\dot{e}_a$ and $\dot{e}_b$ being transformed respectively into two-level signals at respective predetermined levels. Provided in the said phase discrimination circuit is a memory circuit which stores the transformed levels of two beat frequency signals within a one-fourth period during one cycle; thus, the extent of lead or delay of the one beat frequency signal phase relative to the other beat frequency signal phase can be determined from the output of the said memory circuit and at least one beat frequency signal level.

DESCRIPTION OF THE PREFERRED EMBODIMENTS

Figure 1:
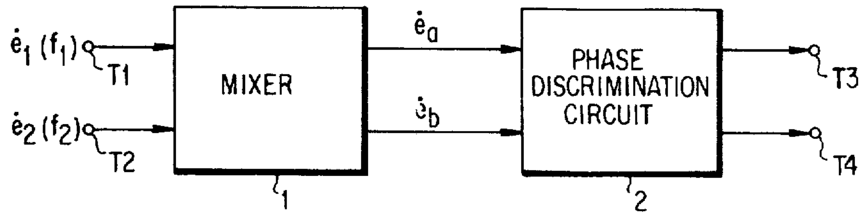
FIG. 1 is a block diagram of the frequency discrimination circuit of the present invention.

FIG. 1 is a generalized block diagram of a frequency discriminating circuit for explaining operations common to the present invention and the said existing Method III. In this figure, T1 denotes the input terminal of a signal $\dot{e}_1$ of frequency $f_1$ to be discriminated; T2 is an input terminal receiving the reference signal $\dot{e}_2$ of frequency $f_2$; numeral 1 denotes a mixer; 2 designates a phase discrimination circuit; and T3 and T4 identify the phase discrimination circuit output terminals.

The signals $\dot{e}_a$ and $\dot{e}_b$ obtained as the outputs of the mixer 1 are the beat frequency signals of $\dot{e}_1$ (frequency $f_1$) and $\dot{e}_2$ (frequency $f_2$). Taking the phase of $\dot{e}_a$ as the reference phase, the phase of $\dot{e}_b$ is always in quadrature relation with the reference phase, and its polarity is reversed according to the relationships of the two frequencies, that is, $f_1<f_2$ and $f_1>f_2$, respectively.

Therefore, the mixer 1 is, for instance, so structured that two modulators are provided, and the input signals $\dot{e}_1$ and $\dot{e}_2$ are directly applied to the one modulator, while one of the signals as applied to the other modulator, is shifted in its phase by 90° from the other of the said inputs $\dot{e}_1$ and $\dot{e}_2$. As a result, the beat frequency signal $\dot{e}_a$ and another beat frequency signal $\dot{e}_b$, which is always in the quadrature phase relation with the signal $\dot{e}_a$ can be obtained from the respective modulators.

Figure 2:
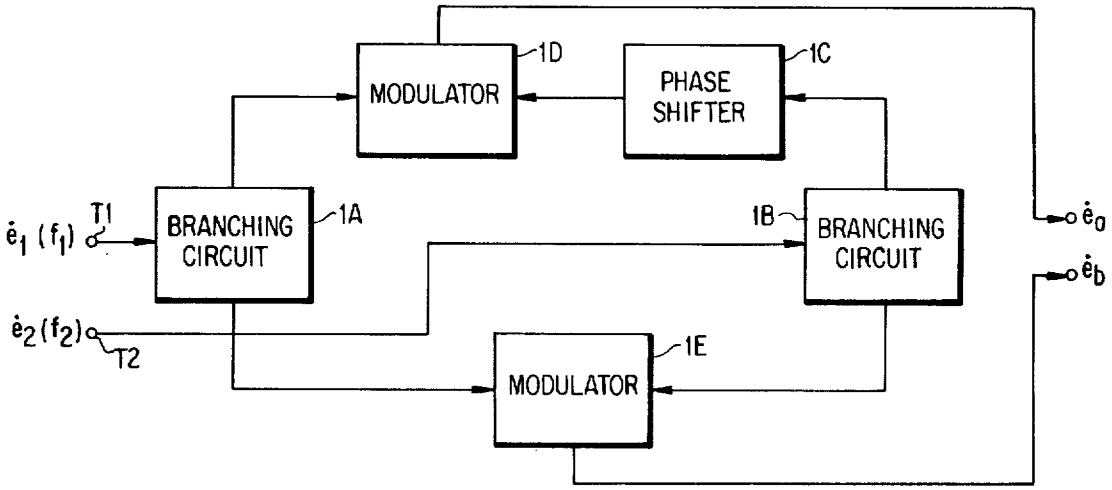
FIGS. 2, 3 and 4 are block diagrams representing circuit examples of the mixer 1 in FIG. 1.
Figure 3:
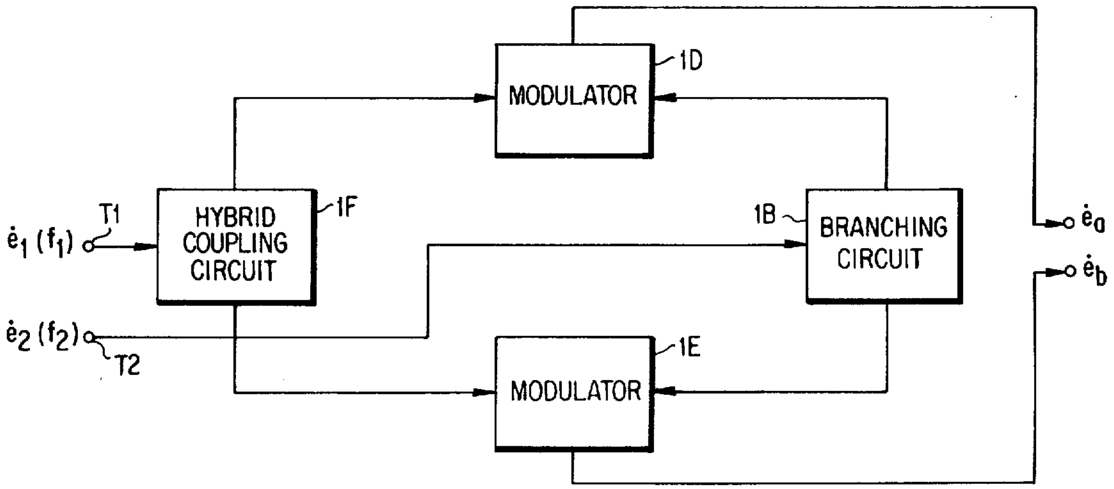
Figure 4:
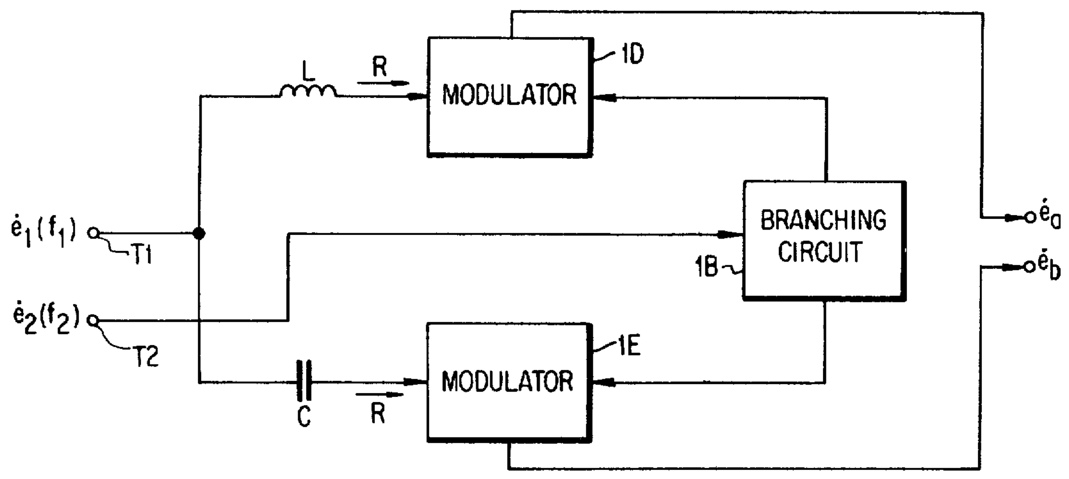

FIGS. 2, 3 and 4 are block diagrams showing examples of structure of the mixer 1 in FIG. 1. In FIG. 2, 1A and 1B denote branching circuits; 1C designates a phase shifter, implemented by a delay line, for instance; 1D and 1E are modulators. The input signal $\dot{e}_1$ (frequency $f_1$) is branched into two signals, which are not always equal, at the branching circuit 1A, and they are sent to the modulators 1D and 1E, respectively. On the other hand, the input signal $\dot{e}_2$ (frequency $f_2$) is also branched into two signals, which are not always equal, at the branching circuit 1B and they are respectively sent to the modulators 1E and 1D, the latter through the phase shifter 1C.

From the modulators 1D and 1E, the output beat frequency signals $\dot{e}_a$ and $\dot{e}_b$ of the input signals $e_1$ (frequency $f_1$) and $e_2$ (frequency $f_2$) can be obtained, and the phase of the one beat frequency signal is reversed according to the relation of the frequencies, that is, to $f_1<f_2$ and $f_1>f_2$ when the phase of the other signal is considered the reference signal, by keeping the input signals $\dot{e}_1$ and $\dot{e}_2$ in an appropriate phase relation.

Keeping the input signal $\dot{e}_1$ and $\dot{e}_2$ in an appropriate phase relation means that the phase difference between $\theta_1$ and $\theta_2$, where $\theta_1$ is assumed to be the phase difference between the signals $\dot{e}_1$ in the modulators 1D and 1E, and $\theta_2$ is assumed to be that between the signals $\dot{e}_2$ in the modulators 1D and 1E, is approximately 90°.

In lieu of the phase shifter 1C in FIG. 2, an economical and effective alternative is to use a coaxial cable of an effective length of λ/4 (λ: wavelength) for the signal $\dot{e}_2$, with a proper characteristic impedance, selected such that the phase delay of the branching circuit 1A-modulator 1D and the branching circuit 1A-modulator 1E is equal to that of the branching circuit 1B-modulator 1D and the branching circuit 1B-modulator 1E.

According to various references, it is well known that the desired, appropriate phase relation between the signals $\dot{e}_1$ and $\dot{e}_2$ can easily be realized by utilizing a 90° shift type hybrid signal coupling circuit, such as shown at 1F in FIG. 3, if the signals are of frequencies in the UHF band, or a proper in-phase or reversed-phase branching circuit.

Moreover, if the input signals $\dot{e}_1$ and $\dot{e}_2$ range from a lower frequency to about 100 MHz, it is also possible to apply one of the input signals $\dot{e}_1$ or $\dot{e}_2$ to its corresponding modulator 1D or 1E after branching it by way of a proper inductance L and capacitor C as shown in FIG. 4, in order to obtain the above phase relationship. In this case, it is preferable that the input impedance of each of the modulators 1D and 1E is specified by the pure resistance value. If the pure resistance value is assumed as R, the optimum phase relation can be obtained only when L, C and R are in the following relation:

$$R = \omega_c L = 1/\omega_c C$$

where $\omega_c$ = Angular frequency of signal concerned. However, generally speaking, so severe a restriction on this relation is not required from the practical viewpoint.

In the foregoing, examples of the structure of the mixer 1 of FIG. 1 have been presented, in reference to FIGS. 2, 3 and 4. As far as the modulators 1D and 1E in these figures are concerned, they may be amplitude modulators using non-linear components, such as transistors or diodes. Therefore, each can be replaced with a balanced mixer or a double balanced mixer (ring modulator), for example.

Figure 5:
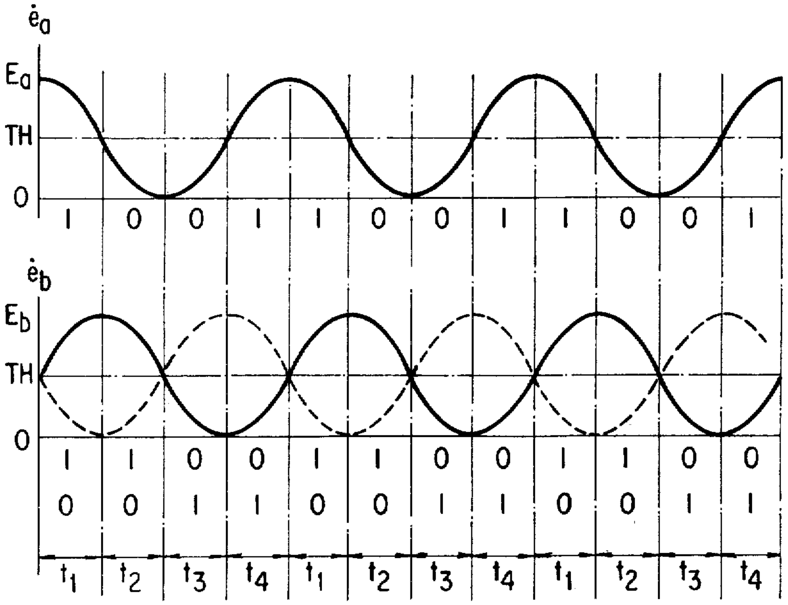
FIG. 5 is a time chart of the beat frequency signals $e_a$ and $e_b$.

Following are equations expressing the beat frequency signals $\dot{e}_a$ and $\dot{e}_b$, which can be obtained as the output signals of the mixer 1 in FIG. 1, and these are plotted in FIG. 5:

$$\dot{e}_a = Ea \cos \omega t \quad (1)$$

$$\dot{e}_b = Eb \cos \omega t + \pi 12) = Eb \sin \omega t \quad (2)$$

$$e_b = Eb \sin \omega t + \pi) = +Eb \sin\omega t \quad (2')$$

Where $E_a$ and $E_b$ are the maximum amplitudes of $\dot{e}_a$ and $\dot{e}_b$, respectively:

$\omega$= Beat frequency ($|f_1 - f_2|$) expressed in terms of the angular frequency.

Therefore, $$\omega = 2\pi(|f_1 - f_2|)$$

where $t$ = Time.

The equations (1), (2) and (2')above are presented under the assumption that the signal $\dot{e}_a$ is the reference signal, wherein equation (2) is for the case of $f_1<f_2$, and the equation (2') is for the case of $f_1>f_2$. The equations (2) and (2') correspond respectively to the solid and dotted lines in FIG. 5.

In the following is an explanation of why the beat frequency signals $\dot{e}_a$ and $\dot{e}_b$ can be expressed as the equations (1) and (2), for example. Assume that the input signals $\dot{e}_1$ and $\dot{e}_2$ to the mixer 1 are expressed, respectively, as:

$$\dot{e}_1 = E \sin\Omega_1 t \quad (3)$$

$$e_2 = E \sin\Omega_2 t \quad (4)$$

where $\Omega_1 = 2\pi f_1$, $\Omega_2 = 2\pi f_2$ and $E$ is the maximum amplitude of the signal, and the two signals are assumed to have the same amplitude for the convenience of the explanation. In addition, the initial phase angles of both signals are assumed to be zero for simplifying the explanation. (Of course, if they are not zero, the result does not vary.)

At the modulators 1D and 1E in the mixer 1, the signal $\dot{e}_1 = E \cdot \sin\Omega_1 t$ is amplitude modulated, for example, by the signals, $\dot{e}_2 = E \sin\Omega_2 t$ and $e_{2'} - E \cdot \sin(\Omega_2 t + \pi/2) = E\cos\Omega_2 t$ (signal obtained by shifting the phase of the $\dot{e}_2$ by 90°), respectively. Therefore, the following equation can be obtained, wherein $\dot{e}_a'$ is assumed to be the modulation signal at the modulator 1D:

$$\begin{aligned} \dot{e}_a' &= E(1 + \sin\Omega_2 t)\sin\Omega_1 t \\ &= \dot{e}_1 + E\sin_2 t \cdot \sin\Omega_1 t \\ &= \dot{e}_1 + \frac{E}{2}\cos(\Omega_2 - \Omega_1)t - \frac{E}{2}\cos(\Omega_1 + \Omega_2)t \qquad (5) \end{aligned}$$

The second term of equation (5) corresponds to the frequency difference between the frequencies $f_1$ and $f_2$ of the input signals $\dot{e}_1$ and $\dot{e}_2$, respectively, namely, the beat frequency signal component. The third term corresponds to the sum of the frequencies of $f_1$ and $f_2$ of the signals $\dot{e}_1$ and $\dot{e}_2$; this term thus represents an unwanted wave component, as does the first term.

Therefore, when the signal $\dot{e}_a'$ is passed through a low-pass filter having an appropriate, adequate cut-off frequency, the signal $\dot{e}_a$ expressed by the equation (6) below can be obtained:

$$\dot{e}_a = \frac{E}{2}\cos(\Omega_2 - \Omega_1)t = \frac{E}{2}\cos\omega t \qquad (6)$$

Similarly, the signal $\dot{e}_b'$ expressed as below can be obtained as the modulation signal at the output of modulator 1E:

$$\begin{aligned} \dot{e}_b' &= E(1 + \cos\Omega_2 t)\sin\Omega_1 t \\ &= \dot{e}_1 + E\cos\Omega_2 t \cdot \sin\Omega_1 t \\ &= \dot{e}_1 + \frac{E}{2}\sin(\Omega_1 + \Omega_2)t - \frac{E}{2}\sin(\Omega_2 - \Omega_1)t \\ &= \dot{e}_1 + \frac{E}{2}\sin(\Omega_1 + \Omega_2)t + \frac{E}{2}\cos[(\Omega_2 - \Omega_1)t + \pi/2] \qquad (7) \end{aligned}$$

Also, when applying this signal to a low-pass filter having an appropriate cut-off frequency, the signal $\dot{e}_b$ expressed by equation (8) can be obtained:

$$\begin{aligned} \dot{e}_b &= \frac{E}{2}\cos\left[(\Omega_2 \quad \Omega_1)t + \frac{\pi}{2}\right] \\ &= \frac{E}{2}\cos\left(\omega t + \frac{\pi}{2}\right) \\ &= \frac{E}{2}\cos\left(\omega t + \frac{\pi}{2}\right) \\ &- \frac{E}{2}\sin\omega t \qquad (8) \end{aligned}$$

where $\omega = \Omega_2 - \Omega_1 = 2\pi(f_2 - f_1)$, $(f_2 > f_1)$.

When $E/2 = E_a = E_b$, the equations (1) and (2) can be obtained from the equations (6) and (8).

In the same way, the equation (2') can be obtained in case of $f_1 > f_2$; however, this showing is omitted here since it is apparent.

Now, if $\dot{e}_a$ is replaced with $\dot{e}_b$ in the equations (1), (2) and (2'), the same result can be obtained.

In the following explanation, the lead and delay of the phase of $\dot{e}_b$ always will be discussed in considering the phase of $\dot{e}_a$ as the reference phase, and simultaneously the signal $\dot{e}_a$ is referred to as the gate signal and $\dot{e}_b$, as the discrimination signal.

As is clear from FIG. 5, the discrimination signal $\dot{e}_b$ is delayed from the gate signal $\dot{e}_a$ in its phase by 90° in case of $f_1 < f_2$ and leads it by 90° in case of $f_1 > f_2$. Of course, if the discrimination signal $\dot{e}_b$ is delayed from the gate signal $\dot{e}_a$ in its phase by 90° in case of $f_1 < f_2$, it leads the gate signal by 90° in case of $f_1 > f_2$.

The phase discrimination circuit 2 in FIG. 1 detects the delay or lead of the phase of the discrimination signal $\dot{e}_b$ against the gate signal $\dot{e}_a$ and produces an AC signal output, based on the beat frequency, exclusively to the output terminal T3 when detecting a delay of phase and exclusively to the output terminal T4 when detecting a lead of phase. Therefore, frequency discrimination can be performed for an AFC function by applying the said AC signal output to various known circuits.

However, the operating principle of the phase discrimination circuit of the present invention is quite different from the above-mentioned existing Method III; as noted above, in Method III, by detecting the amplitude transient of the one beat frequency signal, a pulse signal having constant pulse width is formed, and this pulse signal and the other beat frequency signal are applied to two gate circuits, from which there is produced a discriminator output in accordance with whether the beat frequency signal comes from $f_1 - f_2$ or from $f_2 - f_1$.

Namely, in the time chart in FIG. 5, one period of each of the gate signal $\dot{e}_a$ and the discrimination signal $\dot{e}_b$ is respectively divided into four sections of $t_1$, $t_2$, $t_3$, and $t_4$, as a trial, and the value of each quarter period of each signal is evaluated as one of two levels; that it, 1 or 0 according to whether it is higher or lower than the threshold level TH.

Therefore, the following combination of the gate signal $\dot{e}_a$ and discrimination signal $\dot{e}_b$ can be obtained according to the condition of the signal $\dot{e}_b$:

1. In case the signal $\dot{e}_b$ is given by the solid line (delay):

| | | | | | | | | | | | |
|---|---|---|---|---|---|---|---|---|---|---|---|
| 1 | 0 | 0 | 1 | 1 | 0 | 0 | 1 | 1 | 0 | 0 | 1 |
| 1 | 1 | 0 | 0 | 1 | 1 | 0 | 0 | 1 | 1 | 0 | 0 |

2. In case the signal $\dot{e}_b$ is given by the dotted line (lead):

| | | | | | | | | | | | |
|---|---|---|---|---|---|---|---|---|---|---|---|
| 1 | 0 | 0 | 1 | 1 | 0 | 0 | 1 | 1 | 0 | 0 | 1 |
| 0 | 0 | 1 | 1 | 0 | 0 | 1 | 1 | 0 | 0 | 1 | 1 |

When considering the combination "1, 1" where $\dot{e}_a$ is "1" and $e_b$ is "1", the combinations of levels at the preceding and succeeding points are respectively reversed as "1, 0" "0, 1" in case (1) above, and as "0, 1" "1, 0," respectively in case (2) above.

Thus, the lead or delay phase can be discriminated by storing the previously determined level condition ("1, 1" in the embodiment of the present invention) of the two beat frequency signals in a quarter period and comparing the stored level with a subsequent level condition in which the level of at least one beat frequency signal is varied.

An important characteristic of the present invention, therefore, is that the foregoing principle of operation is realized by providing a memory circuit in the phase discrimination circuit. Further characteristics of the present invention will be made clear in the following explanation.

Figure 6:
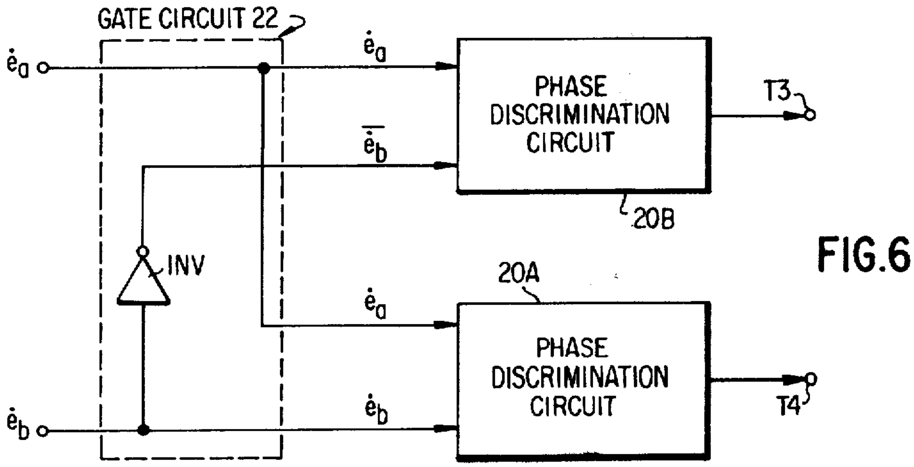
FIG. 6 is a block diagram of one embodiment of the phase identification circuit 2 of FIG. 1.

FIG. 6 shows a block diagram of an embodiment of the phase discrimination circuit 2 of the present invention. INV denotes an inverter; 20A and 20B indicate phase discrimination circuits, as mentioned below.

When two signals having the same frequency, such as $\dot{e}_a$ and $\dot{e}_b$, are applied to the phase discrimination circuit 20A, it outputs to its output terminal T4 an AC signal (generally, a square wave) having the same frequency as the input signal, only when the phase of one signal leads that of the other signal (or, correspondingly, when the other is delayed).

Therefore, the phase discrimination circuit 20B outputs to its output terminal T3 an AC signal having a frequency based on that of the beat frequency signal only when one phase is delayed from the other phase (or the latter leads the former), since the signal $\dot{e}_b$ is applied via the inverter INV. The detection method of such lead and delay of phase can be done by the principle of the present invention.

T3 and T4 in FIG. 6 correspond to T3 and T4 in FIG. 1. The circuit 22, enclosed by the dotted line, which produces the signals $\dot{e}_a$ and $\dot{e}_b$ supplied to the phase discrimination circuits 20A and 20B, is called the gate circuit for the convenience of the later explanation.

Figure 7A:
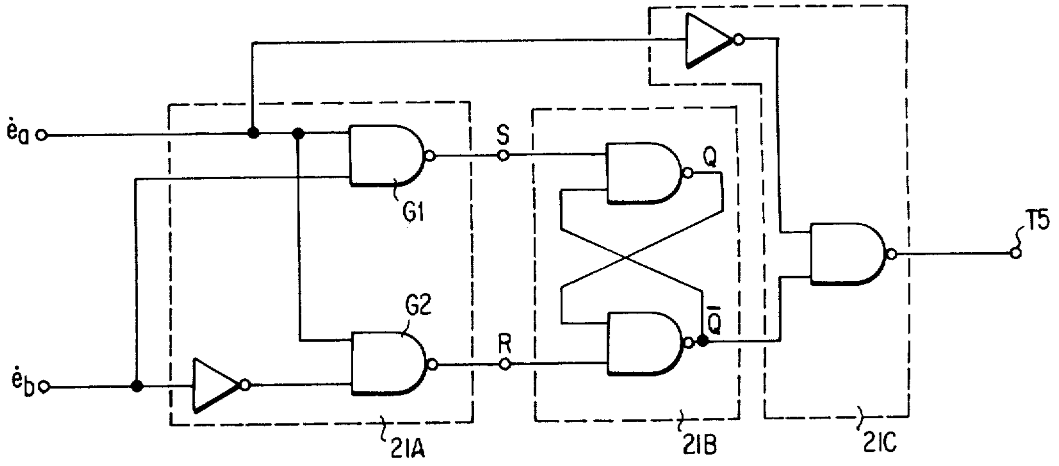
FIG. 7*a* is a logic circuit in accordance with one embodiment of the phase identification circuit 20A in FIG. 6.

FIG. 7(a) shows an example of the phase discrimination circuit 20A of FIG. 6, which uses a well known digital circuit component, the NAND gate.

In FIG. 7(a), the circuit 21A enclosed by the dotted line is an input gate circuit; 21B is a memory circuit; 21C is an output gate circuit. In relating FIG. 7a to FIG. 6, the phase discrimination circuit 20B of FIG. 6 can also be formed by exactly the same manner as that of FIG. 7a, the only difference being that the signal $\dot{e}_b$ is applied as the input via the inverter INV of the gate circuit 22, as shown in FIG. 6.

In FIG. 7(a), the input beat frequency signals $\dot{e}_a$ and $\dot{e}_b$ are assumed to have levels sufficient for completely driving the digital circuits of each of the input gate circuits 21A and the output gate 21C, and to have no levels other than one which is higher than the input threshold level, taken as 1, and another which is lower than the threshold level, taken as 0. In other words, both $\dot{e}_a$ and $\dot{e}_b$ are decoded into two-level signals.

Figure 7B:
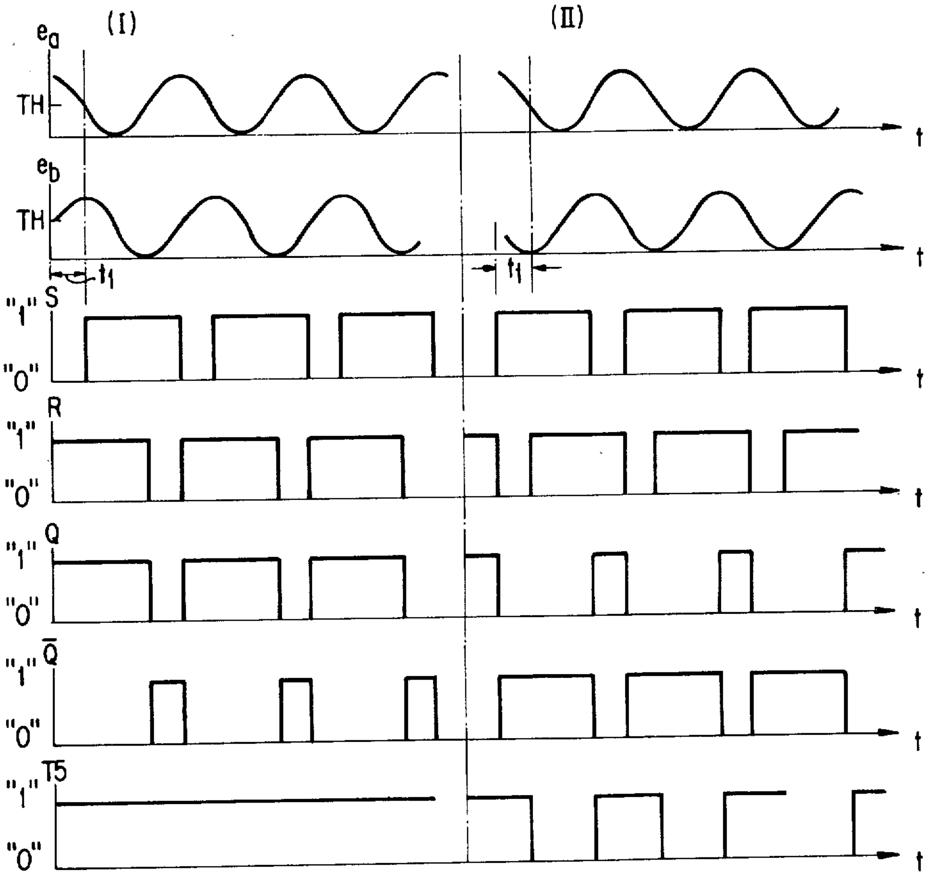
FIG. 7*b* is a timing chart for explaining the operation of the circuit of FIG. 7*a*.

Operations of the phase discrimination circuit in FIG. 7a are shown in the time chart of FIG. 7b. Namely, the left-hand side (I) of FIG. 7b illustrates where $\dot{e}_b$ is delayed in its phase and the right-hand side (II) illustrates where $\dot{e}_b$ leads, and each signal at each circuit junction labelled by a symbol in FIG. 7a corresponds to the waveform so labelled in FIG. 7b. Operations can be summarized as follows. The input gate circuit 21A discriminates whether the discrimination signal $\dot{e}_b$ is 1 or 0 (the result corresponds to the lead or delay of the phase, and 1 corresponds to the delay and 0 corresponds to the lead, in this case) during the predetermined period of the phase of the gate signal $\dot{e}_a$ (in this case, the quarter period $t_1$, and thus before the gate signal $e_a$ transitions to a value of 0 from 1). If $\dot{e}_a$ is discriminated as 1 (upper NAND gate G1 of the input gate circuit 21A operates), S = 0 and R = 1, setting memory (flip-flop) 21B to memorize (store) and produce as outputs Q = 1 and $\overline{Q}$ = 0. If $e_a$ is discriminated as 0, (lower NAND gate G2 of the input gate circuit 21A operates), values corresponding to the outputs Q 0 and $\overline{Q}$ 1 are stored.

For this reason, a square wave output having the same period as the gate signal $\dot{e}_a$ can be obtained at the output terminal T5, since the output gate circuit 21C operates only during an interval when the gate signal $\dot{e}_a$ is 0, thereby making the status on the output terminal T5 0, only when a value corresponding to $\overline{Q}$ = 1 is stored; that is, lead phase is discriminated.

In other words, the phase discrimination circuit in FIG. 7a is so structured by using logic circuits that the gate signal $\dot{e}_a$ is fixed, and the AC output appears at the terminal T5 when the discrimination signal $\dot{e}_b$ is 0 during the predetermined quarter period, i.e., $t_1$ in this case, while the constant output, (i.e., not an AC output) level appears when the signal $\dot{e}_b$ is 1.

The phase discrimination circuit of the present invention is not limited to the embodiment in FIG. 7a. Moreover, the operative combination of the logic gates can be changed by altering the quarter among $t_1$ to $t_4$ which is selected as the reference. Further, other types of phase discrimination circuits can be formed by changing the combination of logic gates, even when the $\dot{e}_b$ is fixed and used as the gate signal.

In addition, the above-mentioned "Beat Polarity Discrimination Type Frequency Discrimination Circuit" can be formed by using the phase discrimination circuit of FIG. 7a for each of the circuits 20A and 20B of FIG. 6.

Figure 8A:
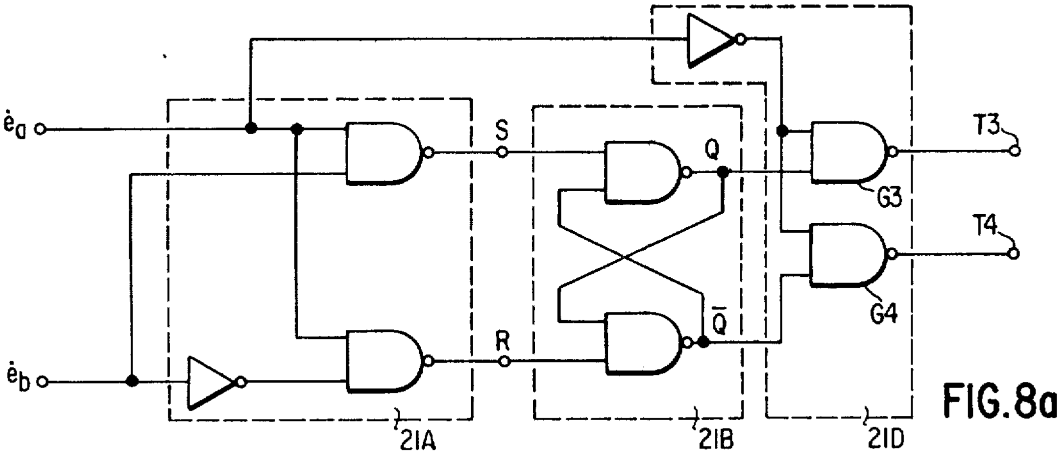
FIG. 8*a* is a logic circuit of another embodiment of the phase identification circuit 2 of FIG. 1.

An improved version of the phase discrimination circuit is shown in FIG. 8a. The circuits 21A and 21B in FIG. 8a respectively correspond to the input gate circuit and memory in FIG. 7a. In this circuit, 21D is the output gate circuit; T3 and T4 are output terminals. The difference between FIG. 8a and FIG. 7a is that the output gate circuit 21C in FIG. 7a is composed of one inverter and one NAND gate and has one output terminal T5, while the circuit 21D in FIG. 8a is composed of one inverter and two NAND gates and gates G3 and G4, and has two output terminals T3 and T4.

Figure 8B:
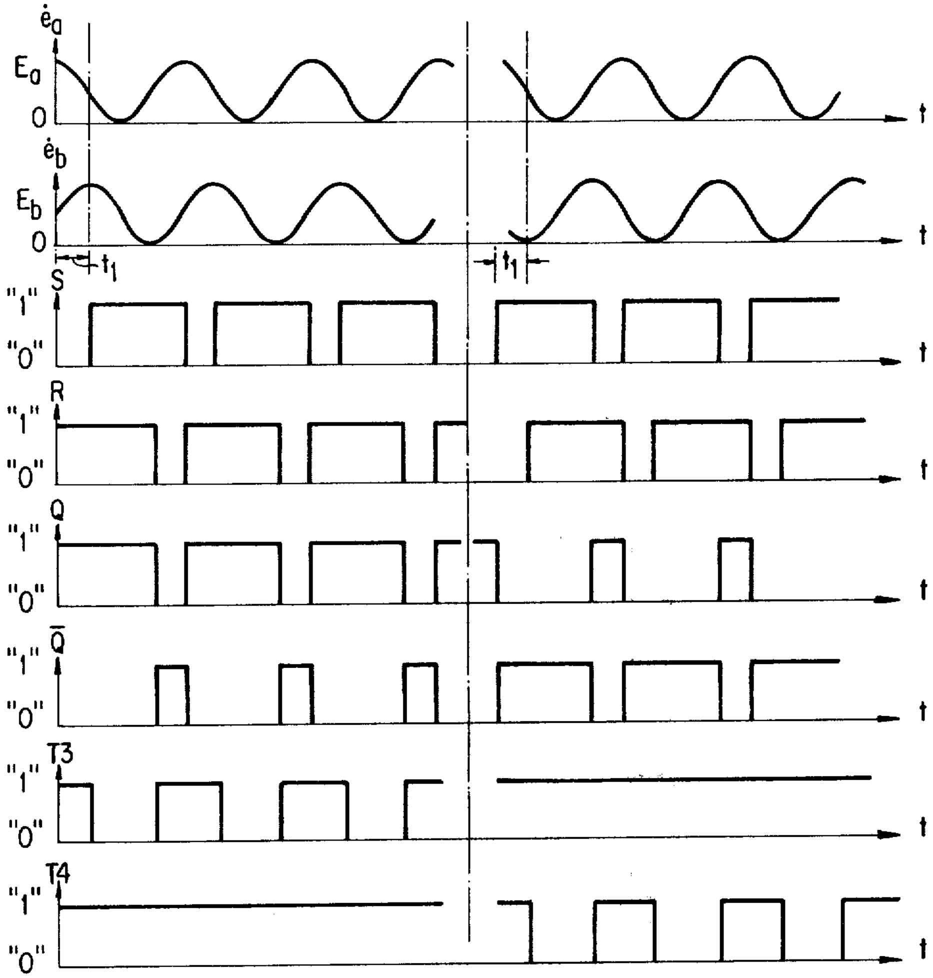
FIG. 8*b* is a timing chart for explaining the operation of the circuit of FIG. 8*a*.

FIG. 8b is a time chart showing the circuit operations of FIG. 8a, the waveform at each labelled circuit point being shown by using corresponding symbols as in the case of the FIG. 7b. The waveforms in the left (I) shows the delay phase, and that in the right (II), the lead phase.

The circuit in FIG. 8a includes both the input gate circuit 21A and memory 21B since the input gate circuit 21A and memory 21B in FIG. 7(a) operate in exactly the opposite manner when discriminating the lead phase of the discrimination signal $\dot{e}_b$ and when discriminating the delayed phase. Thereby, the circuit in FIG. 8a discriminates both the leading or delaying phases of the discrimination signal $\dot{e}_b$ and outputs the square wave signal having the same period as the input beat frequency signal selectively to the terminal T3 in case of lead phase, and selectively to the terminal T4 in case of delay phase; thus, the Beat Polarity Discrimination Circuit can be structured.

Figure 9:
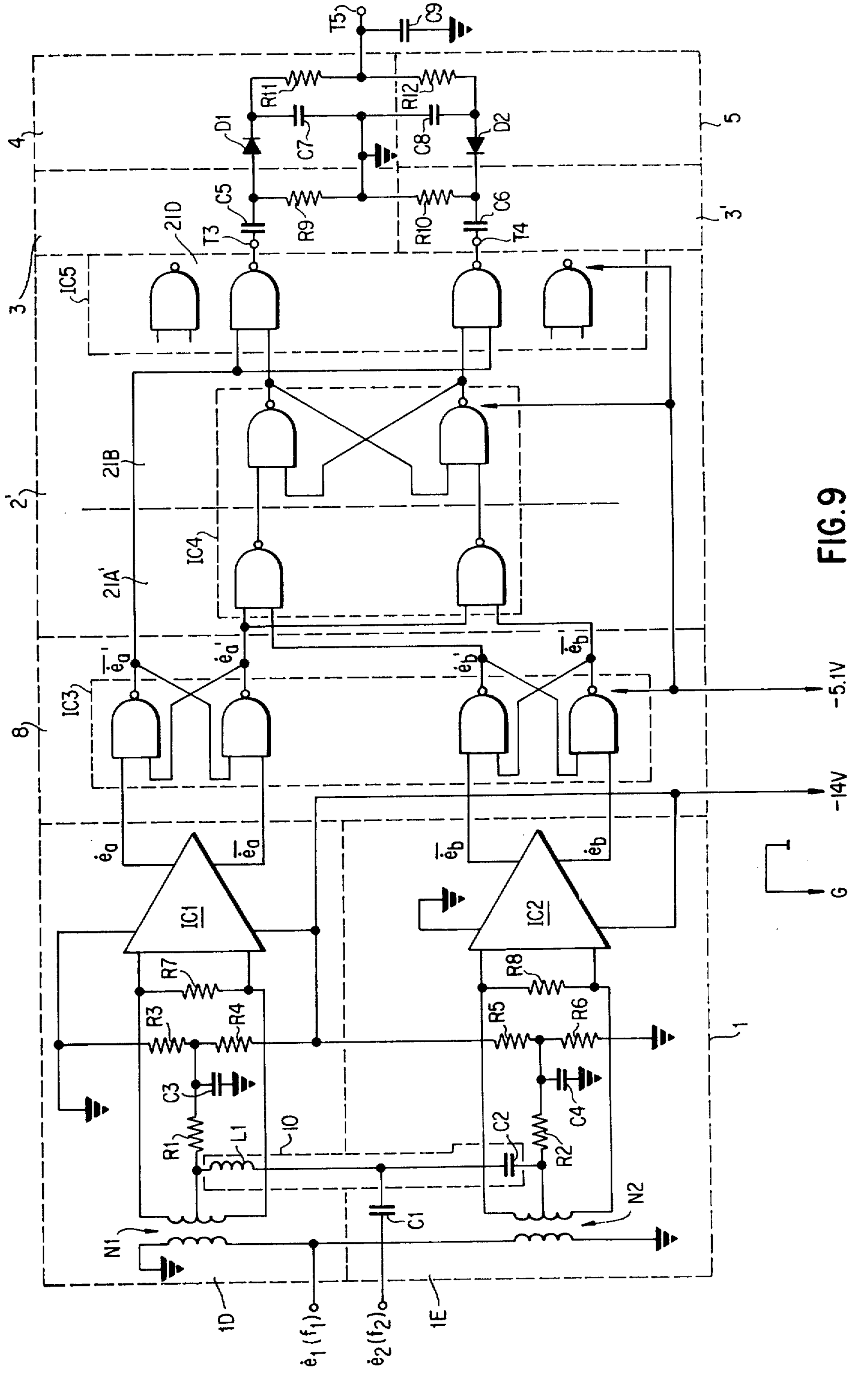
FIG. 9 is a logic circuit of an embodiment of the frequency discrimination circuit of the present invention as incorporated in an AFC circuit.

FIG. 9 shows a schematic diagram of an embodiment of the present invention of a frequency discrimination circuit, when used in an AFC circuit.

In the schematic diagram of FIG. 9, C1 to C9 denote capacitors; R1 to R12 designate resistors; N1 to N2 indicate transformers; L1 identifies a choke coil; and D1 to D2 refer to diodes, respectively. Also in FIG. 9, numeral 1 denotes a mixer which provides the signal to be discriminated, $\dot{e}_1$ (frequency: $f_1$), and reference frequency signal $\dot{e}_2$ (frequency: $f_2$) to the input terminals T1 and T2, respectively. The signal to be discriminated, $\dot{e}_1$, is applied to the input terminal T1 via, for example, a buffer amplifier. The reference frequency signal $\dot{e}_2$ is applied to the input terminal T2 and may be the oscillation output from a reference signal oscillator, such as the crystal-controlled oscillator.

The mixer 1 is composed of two units of balanced mixers 1D and 1E. The balanced modulator 1D is composed of the transformer N1, resistors R1, R3, R4 and R7, capacitor C3 and differential amplifier IC1, while the balanced mixer, or modulator, 1E, is composed of the transformer N2, resistors R2, R5, R6 and R8, capacitor C4 and differential amplifier IC2. At the said balanced mixers 1D and 1E, capacitors C3 and C4 are by-pass capacitors; resistors R3 and R4, R5, R6 are bias supply resistors; and resistors R7 and R8 are the impedance matching resistors for the transformers N1 and N2.

The said signal to be discriminated $\dot{e}_1$ applied to the input terminal T1 is branched into two and in turn fed respectively to the primary side of the transformers N1 and N2 of the mixers 1D and 1E. On the other hand, the reference signal $\dot{e}_2$ applied to the input terminal T2 passes first the DC cut-off capacitor C1 and is branched into two. Then, one is choked by the choke coil $L_1$ and the other is supplied to capacitor C2, the L1 and C2 outputs being supplied to the intermediate taps of the secondary sides of the transformers N1 and N2 provided in the balanced mixers 1D and 1E, respectively. Here, the circuit 10 including choke coil $L_1$ and capacitor C2 forms a phase shifter for giving the phase difference of 90° between the two branched reference frequency signals $\dot{e}_2$, and corresponds to the L and C in FIG. 4. In FIG. 4, the phase difference is produced between the branched components of the signals to be discriminated, $\dot{e}_1$; however, in the case of FIG. 9, the phase of the branched components of the reference signal $\dot{e}_2$ is shifted.

The said differential amplifiers $IC_1$ and $IC_2$ correspond, for example, to the $\mu$A733C made by FAIRCHILD Corporation or MB3501 made by FUJITSU LIMITED in Japan. Numeral 8 is a waveform shaper to which the output signals $\dot{e}_a$, $\bar{\dot{e}}_a$ and $\dot{e}_b$, $\bar{\dot{e}}_b$ of the balanced mixers 1D and 1E are applied. This waveform shaper 8 shapes the beat frequency signals $\dot{e}_a$, $\bar{\dot{e}}_a$ and $\dot{e}_b$, $\bar{\dot{e}}_b$ (sine waves) from the mixer 1 into square waves, and is composed of a flip-flop circuit (also called as latch circuit, a kind of bi-stable circuit) consisting of NAND gates (of course, NOR gates may instead be used). The reason why the said waveform shaper 8 is used, is that wider frequency discrimination range can be assured when the square wave is applied to the next phase discrimination circuit 2' rather than using other waveforms; from the point of view of the operating principle, this circuit 8 is not always required.

The beat frequency signals $\dot{e}_a'$, $\bar{\dot{e}}_a'$, $\dot{e}_b'$, $\bar{\dot{e}}_b'$ which have been shaped at the said waveform shaper 8 are input to the phase discrimination circuit 2'. In this case, the inverter used in FIG. 7*a* and FIG. 8*a* can be omitted in FIG. 9 because the reversed phase signal components $\bar{\dot{e}}_a'$, $\bar{\dot{e}}_b'$ appear simultaneously with the beat frequency signals $\dot{e}_a'$ and $\dot{e}_b'$. In other words, an inverter is not provided in either the input gate circuit 21A' or the output gate circuit 21D' in FIG. 9. Other structures of the phase discrimination circuit 2' are exactly the same as those in FIG. 8*a* and therefore the signals $e_a'$ and $\bar{e}_a'$ are considered the gate signals and the $e_b'$ and $\bar{e}_b'$, the discrimination signals. Two kinds of outputs from the phase discrimination circuit 2' (given by way of the terminals T3 and T4 in the figure) are applied to the rectifier and smoothing circuits 4 and 5 via the differential circuits 3 and 3'; one is composed of the capacitor C5 and resistor R9 and the other is composed of the capacitor C6 and resistor R10. The rectifier and smoothing circuits 4 and 5 are respectively composed of diode D1 and capacitor C7, and resistor R11, diode D2, capacitor C8 and resistor R12. At the said rectifier and smoothing circuits 4 and 5, the output from the differential circuits 3 and 3' is rectified by the diodes D1 and D2 reversely arranged in their polarities. Thus, the rectifier and smoothing circuits 4 and 5 provide the outputs in the reversed polarities to each other. The difference between two outputs can be extracted from the output terminal T5 as mentioned above.

In the schematic diagram of FIG. 9, the circuits IC3 to IC5 are IC's (Integrated Circuits) including four NAND gates and they can be replaced with, for example, the MB400 (Quad 2-input NAND gate) manufactured by FUJITSU, LTD.

Figure 10:
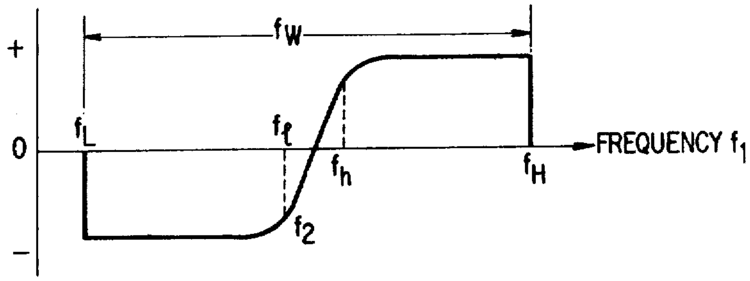
FIG. 10 is a plot of the frequency discrimination characteristic curve of the circuit embodiment of FIG. 9.

FIG. 10 shows the frequency discrimination characteristic (usually called the S-curve) of the circuit in FIG. 9.

In FIG. 10, $f_2$ is the reference frequency signal, and the signal to be discriminated, $f_1$, is graduated on the horizontal axis. The values of $f_c$ and $f_h$ in FIG. 10 are mainly determined by the cut-off frequency of the differential circuits 3 and 3', and that of $f_H$ is governed by the discrimination capability of the phase discrimination circuit 2'.

Generally, the discrimination capability is determined by the high-speed operation performance of the digital circuit components used. Presently, an $f_H$ of approximately 40 MHz can be obtained using one and one-half units (total of 6 NAND gates) of commercially marketed IC's having considerably high speed operation performance, for example, MB400 manufactured by FUJITSU, LTD., mentioned above.

Moreover, it is also possible to obtain several outputs with different frequency discrimination sensitivity, isolated from the viewpoint of DC component, by obtaining several branching outputs from the output terminals T3 and T4 of the phase discrimination circuit 2' and leading them to respective rectifier and smoothing circuits via differential circuits having different circuits having different cut-off frequencies. Similarly, it is possible to convert these branching outputs into audio signals, without applying to the differential circuits 3, 3' and rectifier and smoothing circuits 4 and 5, and then to determine the frequency deviation from the frequencies of the audio signals (in this case, both the reference frequency signal and the signal to be discriminated must be non-modulated signals or modulated by a signal having a constant frequency other than the audio signal's frequency). In addition, it is also possible to apply these branching outputs to an appropriate motor and to know the frequency deviations and direction of the signal to be discriminated from the rotating speed and direction of the motor. In any of the above cases, explanation has been continued under the supposition that the reference frequency signal is a non-modulated signal obtained from a crystal-controlled oscillator. However, a modulated signal may also be employed, from the point of view of the operating principles and practical uses of the invention and in such a case, the average frequency of the modulated signal is used as the reference signal of the S-curve.

As is clear from the above explanation, the present invention assures the use of a stable frequency signal obtained from a crystal-controlled oscillator, for example, as the reference frequency signal with very simple structure and, therefore, high precision and wideband frequency discrimination can be performed. Further, a high performance frequency discrimination circuit can be realized economically because necessary IC's can be employed and are commercially available.

In the foregoing, there have been shown various embodiments responding to and storing the 1,1 condition until such time as the 1,0 condition occurs. In FIG. 8*b*, for example, the 1, 0 condition is in the third period ($f_3$) for a 1, 1 condition taken as the first period ($t_1$) in the delay (lag) case (I), whereas for the lead case (II), the 1, 0 condition is in the second period ($t_2$). The resulting output from the memory thus corresponds to these time intervals: for (I) the delay case Q = 1 is three periods in length whereas for (II) the lead case, Q=1 is only one period in length.

Whereas the memory outputs could be utilized directly (for example by integrating each of Q and $\bar{Q}$ and subtracting the D.C. values) to obtain a measure of the extent of lead or delay, the embodiments disclosed provide further logic for responding to one ($\dot{e}_a$) of the beat frequency signals to produce an A.C. output or a steady D.C. output to indicate the lead/delay conditions, respectively.

As noted, any desired logic condition or relation of the bilevel values of $\dot{e}_a$ and $\dot{e}_b$ can be employed in lieu of the (1, 1) and (1, 0) values through suitable logic decoding by a differently configured logic gate 21A.

Numerous modifications and adaptations of the system of the invention will be apparent to those skilled in the art and thus it is intended by the appended claims to cover all such modifications and adaptations which fall within the true spirit and scope of the invention.

What is claimed:

1. A frequency discrimination circuit comprising:

a mixer, means for supplying to said mixer a first signal of a first frequency to be discriminated and a reference signal of a second frequency, said mixer responding to said first and second signals to produce first and second beat frequency signals in phase quadrature relationship, and a phase discrimination circuit having storing means, means for supplying to said storing means signals representative of the level conditions of the beat frequency signals during successive one-quarter time periods of each cycle of the beat frequency, said storing means storing the signals representative of a predetermined level condition of the beat frequency signals until a subsequent, predetermined level condition of said beat frequency signals representing a predetermined change in the level of at least one thereof, and means responsive to the storage of the said predetermined level condition of said storing means in each of successive cycles of the beat frequency to provide an indication of the extent of lead or delay of the phase of said first signal relative to that of said reference signal.

2. A frequency discrimination circuit as recited in claim 1 wherein said supplying means includes means for transforming each of the beat frequency signals into bi-level signals.

3. A frequency discrimination circuit as recited in claim 2 wherein said supplying means includes logic means for encoding the transformed bi-level values of the beat frequency signals to the said signals representative of the level conditions of the beat frequency signals, for supply to said storing means.

4. A frequency discrimination circuit as recited in claim 1 wherein said storing means comprises a flip flop circuit formed of two logic gates having cross-coupled outputs and inputs and wherein said supplying means supplies said signals representative of the levels of said beat frequency signals to corresponding second inputs of each of said logic gates, the successive level condition representative signals being compared with the corresponding cross-coupled inputs by the respective logic gates whereby the level condition representative signals of each successive quarter time period are compared with those of a prior quarter time period as stored in said storing means.

5. A frequency discrimination circuit as recited in claim 1 wherein said mixer comprises first and second modulators and first and second means for supplying first and second components of each of said first and second signals respectively to said first and second modulators, and phase shifting means included in one of said first and second supplying means for establishing approximately a 90° phase difference between the difference in phase of said first and second components of said first signal and the difference in phase of said first and second components of said second signal, as said components are supplied to said first and second modulators, respectively.

6. A frequency discrimination circuit as claimed in claim 5, wherein said phase shifting means comprises a delay line.

7. A frequency discrimination circuit as claimed in claim 6, wherein said delay line comprises a coaxial cable.

8. A frequency discrimination circuit as claimed in claim 5, wherein said phase shifting means comprises a 90° shift type hybrid coupling circuit.

9. A frequency discrimination circuit as claimed in claim 5, wherein said phase shifting means comprises an inductance and a capacitance.

10. A frequency discrimination circuit as claimed in claim 5, wherein said first and second modulators respectively comprise a balanced mixer.

11. A frequency discrimination circuit as claimed in claim 5, wherein said first and second modulators respectively comprise a double balanced mixer.

12. A frequency discrimination circuit comprising:

a mixer, means for supplying to said mixer a first signal of a first frequency to be discriminated, and a second signal of a second, reference frequency, said mixer responding to said first and second signals to produce first and second beat frequency signals in phase quadrature relation, a phase discrimination circuit including input gate means, memory means, and output gate means, said input gate means responding to said beat frequency signals to produce first and second bi-level encoded output signals representative of the levels of said beat frequency signals, during each one-quarter period of each cycle of the beat frequency, said memory means receiving said bi-level encoded signals and storing a predetermined level condition thereof occurring during one such quarter period and responding to a different predetermined level condition of said encoded bi-level signals to store said different predetermined level condition occurring in a subsequent one-quarter time period of one cycle of the beat frequency, and to produce a corresponding output, and said output gate means responding to the output of said memory means to provide an output indicative of the phase delay or lead of the signal to be discriminated relative to the reference frequency signal.

13. A frequency discrimination circuit as recited in claim 12 wherein said output gate means responds to the reference frequency signal and the output condition of said memory means to produce an output comprising an A.C. signal at the frequency of said reference frequency signal for one of the lead and delay phase relations and producing a steady D.C. output for the other of the lead and delay phase relations of the signal to be discriminated relative to the reference signal.

14. A frequency discrimination circuit as recited in claim 13, wherein said output gate means includes first and second gates respectively receiving first and second outputs of said memory circuit and each receiving the reference frequency signal as a second input thereto, the outputs of said first and second gates being connected to corresponding first and second outputs of said frequency discrimination circuit, said gates alternatively providing to said first and second outputs of said frequency discrimination circuit an A.C. signal at the frequency of the reference frequency signal and a steady D.C. signal in accordance with the lead and delay relations of the signal to be discriminated relative to the reference frequency signal.

15. A frequency discrimination circuit as recited in claim 12 wherein:

said mixer includes means for producing both said first and second beat frequency signals and the respective complements thereof, said input gate of said phase discrimination circuit transforming the beat frequency signals and their complements to bi-level signals and their respective complements, and said output gate means includes first and second gates responsive to the outputs of said memory means and respectively responsive to the said complements of said first and second beat frequency signals, said first and second output gates providing alternatively an A.C. output signal at the frequency of the reference signal and a D.C. output signal in accordance with the lead or delay relation of the signal to be discriminated relative to the reference frequency signal.

16. A frequency discrimination circuit as recited in claim 15 wherein there is further provided first and second differential, rectifying, and smoothing circuits receiving the first and second outputs of said first and second gates, and means for extracting the difference of the thus rectified and smoothed outputs of said differential, rectifying and smoothing circuits, the extracted difference output indicating by amplitude and sign the phase relation of the signal to be discriminated relative to the reference frequency signal.

* * * * *

PO-1050
(5/69)

UNITED STATES PATENT OFFICE
CERTIFICATE OF CORRECTION

Patent No. 3,906,382 Dated September 16, 1975

Inventor(s) Bunichi Miyamoto, Yasuo Tanishima and Takafumi Shimizu

It is certified that error appears in the above-identified patent and that said Letters Patent are hereby corrected as shown below:

Column 4, the equations following line 42 should read as follows:

$$\dot{e}_a = Ea \cos \omega t \quad (1)$$

$$\dot{e}_b = Eb \cos (\omega t + \pi/2) = Eb \sin \omega t \quad (2)$$

$$e_b = Eb \sin (\omega t + \pi) = -Eb \sin \omega t \quad (2')$$

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*